Oct. 29, 1940.  O. E. ANDRUS  2,219,352
PROCESS OF LINING VESSELS BY ELECTRIC FUSION WELDING
Filed Feb. 13, 1937  2 Sheets-Sheet 2
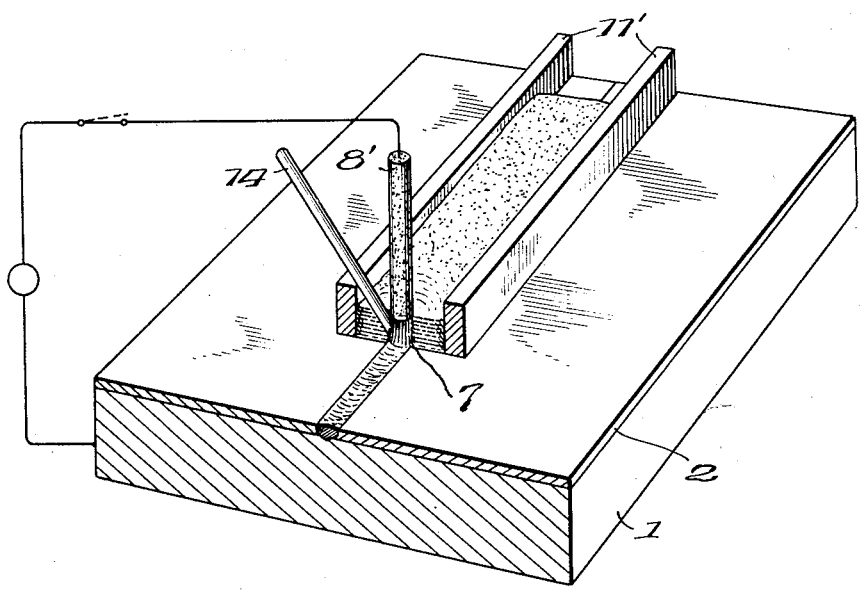
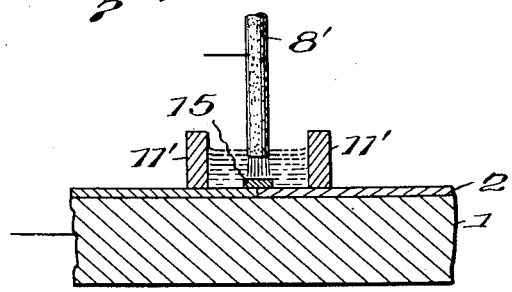
Inventor
Orrin E. Andrus,
By Elvin R. Andrus
Attorney Patented Oct. 29, 1940

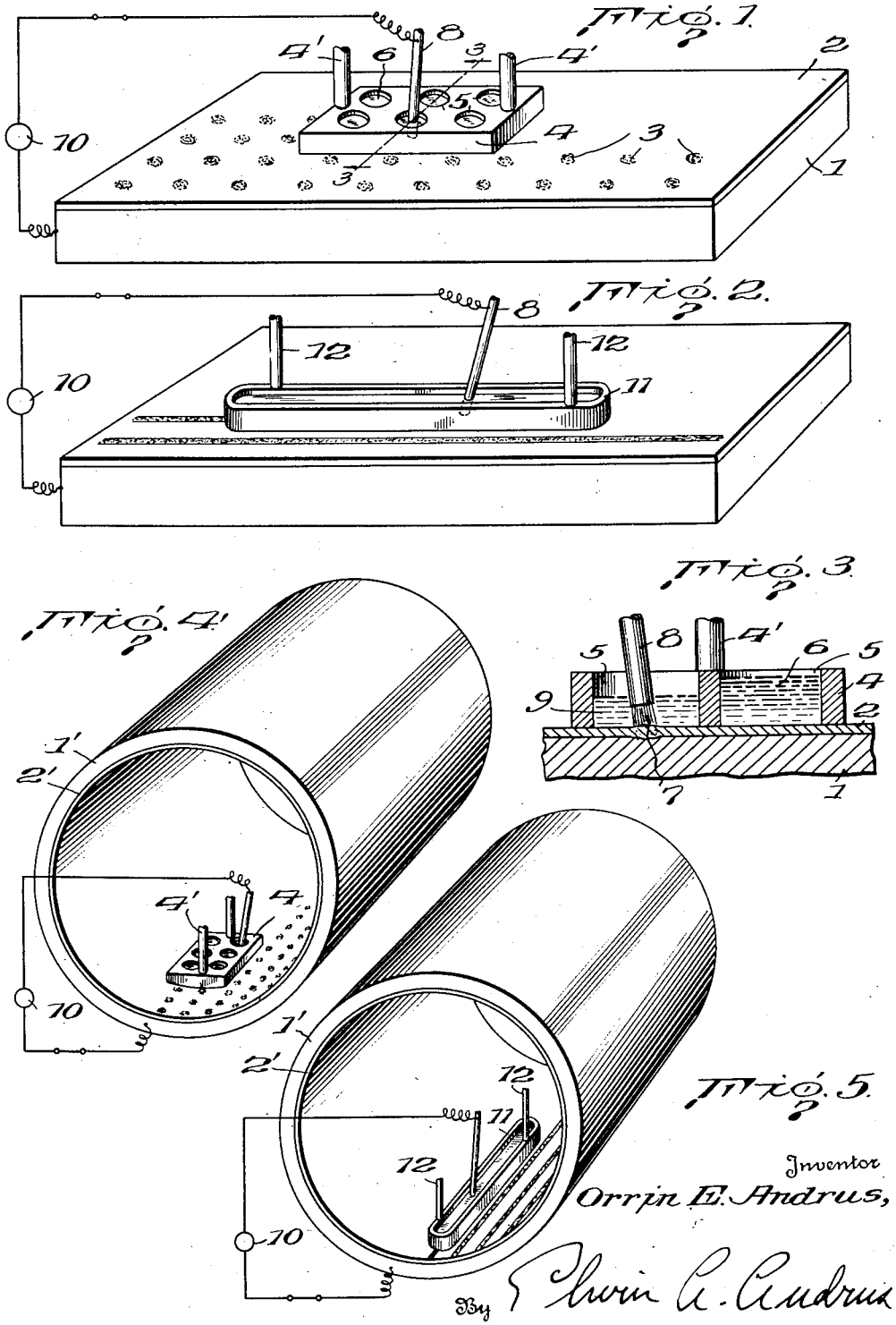

2,219,352

UNITED STATES PATENT OFFICE 2,219,352

PROCESS OF LINING VESSELS BY ELECTRIC FUSION WELDING

Orrin E. Andrus, Milwaukee, Wis., assignor to A. O. Smith Corporation, Milwaukee, Wis., a corporation of New York Application February 13, 1937, Serial No. 125,637

8 Claims. (Cl. 219—10)

This invention relates to a process of lining vessels by electric fusion welding and more particularly to the lining of oil refinery vessels with alloy steels such as chromium steel or chromium nickel steel alloy to protect the vessels from corrosion by constituents of the hot oil.

The present application is a continuation in part of application Serial No. 74,821, filed April 17, 1936, and of application Serial No. 118,759, filed January 2, 1937.

In commercial practice electric resistance spot welding has been employed in the lining of vessels as set forth in U. S. Patent No. 1,680,276, issued August 14, 1928, to the present inventor and Sune Hermanson, jointly. Attempts had been made to deposit a coating of alloy upon the interior of vessels by means of the electric arc employing covered electrodes composed of the desired alloy metal and providing the best known welding conditions to prevent oxidation of the deposited metal. These attempts have not been adopted commercially due to several difficulties not heretofore solved. Similar problems arose when attempting to weld an alloy liner sheet to the steel base plate of vessels by arc welds through a plurality of closely adjacent openings in the sheet.

The object of the present invention is to provide a new process of lining vessels employing the electric arc fusion process and in which these difficulties are largely eliminated.

The invention is based upon the discovery that chromium and nickel alloy steels normally resistant to corrosion can be readily fusion welded to a base plate of steel to form a liner provided the correct process of welding be employed.

The accompanying drawings illustrate the preferred embodiments of the invention, although it will be understood that other embodiments are within the scope and spirit of the invention.

In the drawings the views are as follows:

Figure 1 shows the invention applied to uniting a surface sheet to a flat plate by welding at a series of adjacent spots;

Fig. 2 shows the invention applied to uniting a surface sheet to a flat plate by welding along a plurality of adjacent lines;

Fig. 3 is a vertical sectional view taken along the line 3—3 of Fig. 1;

Fig. 4 illustrates the application of the process of Fig. 1 to the lining of a cylindrical shell;

Fig. 5 illustrates the application of the process of Fig. 2 to the lining of a cylindrical shell;

Fig. 6 illustrates a modified form of the invention used in welding the seams between edges of the liner; and Fig. 7 is a transverse section showing another modified form of the process as applied to a seam in the liner.

In the practice of this invention the alloy lining material is fused to the carbon steel base by means of an electric arc through a molten bath of a stable flux material. Where the electrode employed is of metal it should consist of an alloy composition which will result in the deposition of liner material of the desired final alloy composition. Where the electrode is a carbon, or of other non-fusible material, liner material should be deposited from a fusible alloy weldrod which is melted or fused by the heat of the arc, or it should be supplied as an alloy strip or sheet laid in the path of the arc.

In the process illustrated in Fig. 1, the flat plate 1 of appropriate carbon steel has an alloy liner sheet 2 applied to its upper surface. The liner 2 is shown as spot welded to the plate 1 at a plurality of points 3. In the welding process, in this embodiment it is preferable to employ a mold or perforated plate 4 with the holes 5 spaced at the desired intervals for the spot welds. The holes 5 are then filled with a powdered flux material 6, as illustrated in Fig. 3, and the arc 7 established between the end of an electrode 8 and the work. The heat of the arc melts the flux 6 and provides a molten flux bath 9 in which the arc 7 is preferably wholly submerged, and which prevents oxidation of the molten metal and provides uniform distribution of heat to the parts being welded. The plate 4 not only serves to confine the molten flux and hold it near the arc, but may also advantageously be employed to press the surface sheet 2 into close contact with the plate 1, to which it is to be welded. To this end the plate 4 may be firmly pressed down by fingers 4' actuated by holding down mechanism, not shown. Either direct current or alternating current may be employed.

The flux material 6 should be a slag which, when heated to arc temperatures, does not react within itself or with the metal being heated to produce undesirable gases or deposits. It is preferable, therefore, to employ a single element or compound as distinguished from a mixture of elements or compounds. For example, sodium chloride is suitable for welding stainless steels and similar corrosion resistant alloys. Borax is also very good as a slag. Sodium silicate crystals have also been employed. It is also possible to employ mixtures of these materials. Sufficient powdered flux should be employed to provide a molten flux bath of say about one-half an inch in depth.

The liner may be of any stainless steel composition, such as one having about 18% chromium and 8% nickel, or it may be of chromum steel, or other corrosion resistant alloy or metal suitable for the lining of vessels.

The electrode 8 is connected to a suitable source of welding current 10, the other terminal of the source being connected to the work, as to the base 1. The electrode 8 may be either a metal rod or a carbon pencil. In case the electrode consists of a metal rod, it should be of an alloy composition which, when fused with the work, will result in a deposit of similar alloy content as the desired liner. Any additional bead or deposit may be ground off in the final step if desired.

In the process of establishing the arc the electrode is momentarily brought into contact with the surface sheet 2 and is then withdrawn from it. The heat of the arc fuses the fluxing material 6 placed in the holes 5 in plate 4. The liner 2 is securely welded to the base 1. The process is quiet and the arc is not accompanied by the sputtering commonly present with welding arcs in gas. It is possible to raise the electrode 8 above the surface of the molten flux, thereby establishing a gaseous arc above the flux without materially changing the results, provided a sufficient thickness of molten flux is employed, so that the arc does not form a crater through the flux and blow the flux away from the heated metal. There is some danger, however, of air or gas being introduced into the flux and creating unstable conditions for welding. It is advisable to keep the lower end of the electrode 8 beneath the surface of the molten flux at all times.

The penetration of the heat into the work parts and consequent fusion of the base may be controlled within limits to prevent undue dilution of the alloy liner. The heavy base 1 serves as a chill for the weld and assists in preventing undue penetration of fusion.

Fig. 2 illustrates the invention as applied to uniting a surface sheet to a backing plate by line welding instead of spot welding. A long trough 11 open at the top and bottom serves to hold the flux in place. This trough 11 may also be held down by fingers 12 to press the surface sheet 2 into firm contact with the base 1. When using the trough 11, the weld may be a continuous line or may be a series of isolated spots arranged in line.

The composite plate composed of the base 1 and its liner is formed into a cylinder or a head, as the case may be, from which, along with similar composite parts, the final vessel is fabricated much as illustrated in the U. S. Patent No. 1,840,305, issued January 12, 1932, to the present inventor and Sune Hermanson, jointly.

Figs. 4 and 5 illustrate the invention as applied to welding a corrosion resistant alloy liner to a previously fabricated vessel or shell. The liner 2' may be secured to the shell 1' of the vessel by arc welding either in spots or along a line. By welding along the junction line of two adjacent edges of the liner these are welded to each other and to the backing plate and a continuous corrosion resistant surface is provided.

This latter step of welding the seam in the liner during fabrication of the vessel is illustrated in Figs. 6 and 7. These figures also specifically illustrate the methods employed for adding alloy weld metal where a carbon electrode 8' is employed. In Fig. 6 the additional alloy weld metal is deposited from an alloy weldrod 14 which is fed into the arc 7 to the point of concentration of current flow between the electrode and the work. In Fig. 7 the additional alloy weld metal is laid on the joint previous to welding and is in the form of a strip 15. The mold 11' for confining the flux comprises two side walls, one on each side of the seam.

The process of welding the liner sheet 2 to the base plate 1, as shown in Figs. 1 to 7, may be carried on with a carbon electrode without the addition of deposited alloy metal or of a strip such as strip 15.

I claim:

1. The method of securing a sheet of corrosion-resistant-alloy to an extended surface of a body made of dissimilar metal, which comprises placing the alloy sheet in contact with the extended surface of the body made of dissimilar metal, disposing over the alloy sheet a body of metal provided with one or more perforations to confine a flux placed within the perforations, placing a material to serve as a flux within said perforations, and establishing and maintaining an electric arm through a molten body of flux in each of said perforations to melt the metal of the alloy sheet and weld it to the surface of the body of dissimilar metal.

2. In the welding of an alloy sheet to a surface of a body of dissimilar metal, the steps which comprise placing the alloy sheet in contact with the surface to which it is to be welded, striking an electric arc between the alloy sheet and a fusible metallic electrode of similar composition, maintaining said arc through a body of molten flux in contact with the alloy sheet, and depositing metal from the fusible metallic weldrod to unite with the molten metal of the alloy sheet and weld it to the surface of the body of dissimilar metal.

3. In the coating of metal articles with a protective metal coating, the method of securing a relatively thin sheet of the protective metal to the surface of the article, which comprises placing the sheet in substantially continuous contact with the surface of the article to be coated, and applying an electric arc through a bath of a stable molten flux material covering the sheet to melt the metal of the sheet in adjacent spots or lines and weld it to the surface of the article.

4. The method of coating base metal with a protective layer of another metal which comprises, covering a surface of the base metal with a layer of the coating metal, applying a blanket of flux forming material on top of said coating metal, and discharging electric current through a gap beneath the surface of the flux blanket to fuse the coating metal to the base metal and provide an integral bond therebetween.

5. The method of coating base metal with a protective layer of another metal which comprises, covering a surface of the base metal with a sheet of the coating metal, applying a thick layer of flux forming material on top of said sheet, and discharging electric current through a plurality of gaps beneath the surface of the flux blanket to fuse said sheet to the base metal at a plurality of spaced areas.

6. The method of securing a sheet of alloy to an extended surface of a body of dissimilar metal, which comprises placing the alloy sheet in contact with the surface to which it is to be secured, and fusing the sheet in successive areas by applying an electric welding arc thereto through a body of molten flux covering the said areas being fused, the fusing operation being conducted to effect limited penetration of the base metal beneath the lining and to limit dilution of the sheet from said base metal.

7. The method of fusing a sheet of alloy to an extended surface of a body of dissimilar metal without undue dilution of the alloy from penetration of the fusion area into the base metal beneath, comprising pressing the sheet into contact with the surface to which it is to be secured, and fusing the sheet and to a limited depth the base metal beneath in spaced areas by applying an electric welding arc thereto through a body of stable molten flux covering the said areas being fused.

8. The method of fusing a sheet of alloy to an extended surface of a relatively thicker body of dissimilar metal without undue dilution of the alloy from penetration of the fusion area into the base metal beneath, comprising pressing the sheet into contact with the surface to which it is to be secured, applying an electric welding arc to the surface of the sheet over an area to be bonded and beneath a blanket of flux forming material to fuse the sheet and to a limited depth the base metal beneath, and applying a mass of metal in contact with said sheet adjacent the area being bonded to confine the molten flux and chill the fusion area thereby limiting the depth of penetration.

ORRIN E. ANDRUS.